United States Patent Office 3,537,888
Patented Nov. 3, 1970

3,537,888
PROCESS AND COMPOSITION FOR
METALLIZING CERAMICS
Raymond E. Schwyn, Flint, Mich., assignor to General
Motors Corporation, Detroit, Mich., a corporation of
Delaware
No Drawing. Filed June 10, 1968, Ser. No. 735,549
Int. Cl. C04b 41/14; C23c 17/00
U.S. Cl. 117—123                                    7 Claims

ABSTRACT OF THE DISCLOSURE

A method of producing a metallized surface on ceramic bodies with a metallizing ink containing mullite ($3Al_2O_3 \cdot 2SiO_2$). An example of such a metallizing ink is a composition containing 20 parts mullite, 80 parts molybdenum and 25 parts liquid vehicle.

---

This invention relates to a metallizing process for ceramics and more particularly to a metallizing ink composition.

Hermetic ceramic-to-metal seals having high strength are required in the manufacture of high vacuum tube envelopes and other feedthrough insulators for electrical devices. In making these ceramic-to-metal seals it is necessary to form a vacuum-tight bond between the ceramic body and the metal. This is generally accomplished by metallizing the surface of the ceramic body; that is, bonding a thin metallic film onto the surface of the ceramic body and then bonding this metallized surface to the metal portion of the electrical device by conventional means. Most commonly used metallizing processes involve the use of molybdenum and manganese metals in which the manganese reacts with the water vapor when heated in a wet, hydrogen atmosphere to form manganese oxide. The manganese oxide reacts with the glass phase in the ceramic to form a compound which melts to form a bonding layer. This bonding layer adheres tightly to both the surface of the ceramic body and to the thin metallic film of molybdenum. In metallizing ceramic bodies which are relatively glass-free, it is the usual practice to add silica to the metallizing ink in order to promote the formation of the bonding layer. Although the presence of silica in a metallizing ink enables a bond to be formed between the metal and the ceramic body, the bond existing therebetween is not of sufficient strength for many applications.

It is a primary object of this invention to provide an improved method of metallizing sintered ceramic bodies. It is another object of this invention to provide an improved method of metallizing fine grained, high purity, sintered alumina bodies which are difficult to metallize. It is still another object of this invention to form a metallized high purity alumina body which has a relatively strong bond between the metal and the alumina body.

These and other objects are accomplished by metallizing a sintered ceramic body with a metallizing ink composition containing fine grained mullite powder. A specific embodiment in accordance with the practice of this invention is a metallizing ink composition containing a liquid vehicle, mullite powder and molybdenum powder. The metallizing ink composition is sprayed onto the surface of a high purity sintered alumina body. The body is then fired in a wet reducing atmosphere to yield a metallic layer tightly bonded to the surface of the high purity alumina body. The mullite powder in the metallizing ink composition enables the molybdenum to adhere or bond tightly to the alumina surface.

Further objects and advantages of the present invention will be apparent from the following detailed description of a preferred embodiment of the present invention.

In general, the process of this invention may be carried out as follows. Mullite powder is mixed with one er more of the well known metallizing metals such as molybdenum and tungsten to form a powdered metallizing mixture. The concentration of the mullite in the powdered metallizing mixture is 10 to 40 weight percent. The particle size of the mullite powder is between 1 to 30 microns with the preferred size being less than 5 microns. The particle size of the molybdenum and tungsten metallizing metals used in the mixture is less than 5 microns with the preferred particle size of these powders being 2 to 5 microns. The concentration of these well known metallizing metals, for example, molybdenum, in this mixture is from 60 to 90 weight percent. A mixture of molybdenum and manganese as well as a mixture of tungsten and manganese in which the mixtures contain 5 to 40 weight percent manganese may be used in place of the molybdenum or tungsten.

The finely divided powdered mixture is applied to the surface of a sintered ceramic body. As is a common practice in the art, the metallizing powder mixture is mixed with a liquid vehicle to form a metallizing ink composition which is applied onto the surface of the body by brushing, spraying, screening or other suitable methods. Any suitable liquid vehicle which is commonly used in metallizing ink compositions can be employed in the practice of this invention. The concentration of the liquid vehicle in the metallizing ink composition is 10 to 30 pjarts by weight per 100 parts mullite-metal powder mixture. The liquid vehicle contains sufficient binder therein to supply 1 to 4 parts by weight binder to the metallizing ink composition. Examples of suitable liquid vehicles are Squeegee Medium 163, a commercially available metallizing ink vehicle from Reusche and Company, and a dibutyl carbitol solution containing a binder, ethyl cellulose.

The metallizing ink composition of this invention has been successfully applied to alumina and beryllia ceramic bodies. This metallizing ink composition is particularly useful in metallizing fine grained ceramics and ceramics containing magnesia which are difficult to metallize. For example, substantially glass-free, high purity alumina bodies having a content of 99% or more $Al_2O_3$ have been successfully metallized in accordance with this invention. The ceramic bodies are prepared by conventional grinding, molding and sintering techniques.

After the ceramic body has been coated with a film or layer of the metallizing ink, it is then heated in a moist reducing atmosphere. A disassociated ammonia atmosphere having a dew point of 80° F. is preferred for this purpose. Other reducing atmospheres known in the art are also satisfactory. The coated ceramic body is fired in this reducing atmosphere for a period of approximately 30 minutes at a temperature ranging from 2200 to 3200° F. depending on the ceramic. Firing under these conditions sinters the metal mixture to form a metallic layer which adheres or bonds tightly to the ceramic body. The mullite powder, for some reason which we are unable to explain, bonds the metallizing metal, for example, molybdenum more tightly to the ceramic than metallizing inks containing silica.

Typical examples in accordance with the practice of this invention for metallizing sintered ceramics are as follows:

EXAMPLE 1

A high purity alumina body containing 99 weight percent alumina and 0.12 weight percent MgO was coated with a metallizing ink composition which contained 20 parts by weight mullite powder, particle size less than 30 microns; 80 parts by weight molybdenum powder, particle size 2 to 5 microns; and 25 parts by weight of a commercially available metallizing liquid vehicle, Squeegee Medium 163 C. The coated alumina ceramic body was fired at 3000° F. for 30 minutes in a disassociated ammonia atmosphere having a dew point of 80° F.

The resultant metallized alumina body has an outer metallic layer which was tightly bonded to the alumina. The strength of the bond between the alumina and the outer metallic layer are evaluated by two different tests. The first test is a fast and simple test in which a small area of the metallized surface is cut away with a razor blade and the ceramic surface and the condition of the metal removed are observed. The quality of the bond is determined by the amount of metal that cannot be removed from the ceramic, that is, the higher quality bond will have a larger quantity of metal which cannot be removed from the ceramic. The metallized alumina prepared in Example 1 was subjected to this test and the quantity of metal that could not be removed from the ceramic was of such an amount to indicate that the bond was a superior bond. In contrast, the same ceramic which was metallized by a mullite-free molybdenum ink containing an equivalent amount of silica therein produced a metallized surface which had a good rating in accordance with this test. The same ceramic metallized with molybdenum alone gave a bond which had a poor rating in accordance with this test.

The bond in Example 1 was also evaluated by a more accurate test which is referred to as a modulus of rupture test. In this test two ceramic blocks of a given size are bonded together with the metallizing ink. Pressure is then applied perpendicularly to the ceramic blocks on top of the metallized bond connecting the two blocks together. The higher the pressure required to rupture the bond between the two ceramic blocks, the stronger the bond formed by the metallizing ink. In Example 1, the mullite containing metallizing ink formed a bond which had a modulus of rupture of about 42,000 pounds per square inch. In contrast, a bond formed with a metallizing ink formulation similar to the mullite formulation except that the mullite has been replaced with silica, will have a value estimated to be about 35,000 pounds per square inch. A bond formed with a metallizing ink containing only molybdenum will have a value of less than 10,000 pounds per square inch. The results from the modulus of rupture tests, and with the test using a razor blade, indicate that the bond formed with mullite in the metallizing ink is considerably sronger than that obtained with a silica containing metallizing ink.

EXAMPLES 2 THROUGH 8

The following table lists Examples 1 through 6 in which different ceramics were coated with a metallizing ink composition taught in accordance with this invention.

containing magnesia which are difficult to metallize and beryllia. In all of these examples the metallic film adhered tightly to the ceramic body. In addition, the metal powder sintered well to form the desired metallic film.

The preferred method of applying the mullite-metal powder mixture is by the use of a metallizing ink composition. It is also possible to use the mullite-metal powder mixture impregnated adhesive tape which can be applied to the ceramic. Another way in which the mullite metal powder mixture can be applied is to coat the ceramic article with an adhesive and subsequently bring the sticky adhesive coated surface of the ceramic in contact with the mullite-metal powder mixture.

The metallizing ink composition may contain a number of organic solvents as the liquid vehicle, such as ethyl acetate, methyl acetate, amyl acetate, methylethylketone, acetone, benzene, xylene, toluene, cyclohexane, isopropanol, ethyleneglycol dibutyl ether and the like. Preferred binders which are added to the liquid vehicle are ethyl cellulose and nitro cellulose.

While the present invention has been described in terms of specific examples, it is to be understood that the scope of the invention is not limited thereto except as defined by the following claims.

What is claimed is:

1. A method of metallizing the surface of a sintered ceramic body comprising the steps of applying a layer of a metal powder mixture onto said surface, said mixture comprising 10 to 40 weight percent mullite and a metal powder taken from the group consisting of molybdenum, molybdenum-manganese mixture, tungsten and tungsten-manganese mixture where said manganese mixtures contain 5 to 40 weight percent manganese, and sintering said layer onto said ceramic body in a moist reducing atmosphere whereby said mullite causes said metal taken from said group to form a firmly adherent metal coating on said ceramic body.

2. A method as described in claim 1 wherein said metal is molybdenum.

3. A method as described in claim 1 wherein said metal mixture is dispersed in a volatile liquid vehicle.

4. A mixture for use in forming a metallized surface on a sintered ceramic body comprising 10 to 40 weight percent mullite and a metal taken from a group consisting of molybdenum, molybdenum-manganese mixture, tungsten and tungsten-manganese mixtures where said manganese mixtures contain 5 to 40 weight percent manganese.

5. A mixture as described in claim 4 wherein the concentration of said mullite is about 16 to 24 weight percent.

6. A mixture as described in claim 5 wherein said metal is molybdenum.

7. A metallizing ink composition for use in forming a metallized surface on a sintered ceramic body comprising 10 to 40 parts by weight mullite, 60 to 90 parts by weight of a metal taken from the group consisting

| Example No. | Ceramic | Analysis | Sintering temp., °F.[1] | Metallizing ink composition [2] | Bond strength Blade test | Modulus test. lbs./in $^2$ |
|---|---|---|---|---|---|---|
| 1 | Fine grained alumina. | 99% Al$_2$O$_3$, 0.12% MgO | 3,000 | {20 parts mullite, 80 parts Mo<br>20 parts SiO$_2$, 80 parts Mo<br>80 parts Mo | Very good<br>Good<br>Poor | 42,000<br>[3] 35,000<br><10,000 |
| 2 | do | 95% Al$_2$O$_3$, MgO | 3,000 | 20 parts mullite, 80 parts Mo | Very good | |
| 3 | do | 98% Al$_2$O$_3$ | 3,000 | do | do | |
| 4 | do | 99% Al$_2$O$_3$ | 3,000 | do | do | |
| 5 | do | 99.5% Al$_2$O$_3$, 0.05% MgO, 0.05% Y$_2$O$_3$ | 3,000 | do | do | |
| 6 | Fine grained beryllia. | | 2,900 | do | do | |

[1] 30 minutes in a disassociated ammonia atmosphere having a dew point of 80° F.
[2] Plus 25 parts liquid vehicle.
[3] Estimated.

The data in the table shown above indicates that the metallizing ink composition can be used effectively on high purity, fine grained alumina bodies, alumina bodies of molybdenum, molybdenum-manganese mixture, tungsten and tungsten-manganese mixtures where said manganese mixtures contain 5 to 40 weight percent manganese and 10 to 30 parts by weight of a liquid vehicle where said liquid vehicle provides 1 to 4 parts by weight binder to said ink composition.

References Cited
UNITED STATES PATENTS

| | | | |
|---|---|---|---|
| 2,835,967 | 5/1958 | Umblia | 117—22 X |
| 2,902,756 | 9/1959 | Cavanaugh | 117—22 X |
| 2,903,788 | 9/1959 | Pryslak | 117—22 X |
| 3,023,492 | 3/1962 | Bristow | 117—22 X |
| 3,189,476 | 6/1965 | Cowan | 117—160 X |
| 3,241,995 | 3/1966 | Pulfrich et al. | 117—22 |
| 3,290,171 | 12/1966 | Zollman et al. | 117—160 |
| 3,323,924 | 6/1967 | McRae et al. | 106—1 |
| 3,347,704 | 10/1967 | Meyer | 117—22 X |
| 3,352,694 | 11/1967 | Reed et al. | 117—160 X |
| 3,403,043 | 9/1968 | Thompson | 117—160 X |

ALFRED L. LEAVITT, Primary Examiner

J. R. BATTEN, Jr., Assistant Examiner

U.S. Cl. X.R.

29—473.1; 106—1; 117—22, 160, 227